(12) United States Patent
Akahori

(10) Patent No.: US 7,532,905 B2
(45) Date of Patent: May 12, 2009

(54) FILTER DEVICE AND TRANSMISSION POWER CONTROL APPARATUS

(75) Inventor: Hiroji Akahori, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 827 days.

(21) Appl. No.: 10/735,709

(22) Filed: Dec. 16, 2003

(65) Prior Publication Data

US 2004/0253971 A1 Dec. 16, 2004

(30) Foreign Application Priority Data

Jun. 16, 2003 (JP) ............................. 2003-170388

(51) Int. Cl.
*H04B 7/00* (2006.01)
*H04B 15/00* (2006.01)
*H04B 7/185* (2006.01)

(52) U.S. Cl. ....................................... 455/522; 370/318
(58) Field of Classification Search ................. 455/522; 370/318
See application file for complete search history.

(56) References Cited

U.S. PATENT DOCUMENTS 5,590,409 A * 12/1996 Sawahashi et al. ............ 455/69

(Continued)

FOREIGN PATENT DOCUMENTS

JP  11-196042   7/1999
JP  2000-209149 7/2000

OTHER PUBLICATIONS

Eguchi Yoshihiro, Official Notice of Reason for Rejection, Sep. 27, 2005, Reference No. CA000812, Japanese Patent Office, Japan.

*Primary Examiner*—Matthew D Anderson
*Assistant Examiner*—Bobbak Safaipour

(74) *Attorney, Agent, or Firm*—Studebaker & Brackett PC; Donald R. Studebaker

(57) ABSTRACT

The present invention provides a filter device and a transmission power control apparatus capable of outputting transmission power in the form of apparent loop gain commensurate with the present communication circumstances while maintaining settings provided as loop gain under transmission power control. The filter device comprises an integrator for integrating control information supplied thereto over a period up to being reset, and outputting an integrated value, a direction determining circuit to which a first threshold value for determining an increasing direction and a second threshold value for determining a decreasing direction are set in advance, and which compares these set threshold values and the integrated value respectively and outputs direction information indicative of a coincident control direction of these results of comparison, and an information generator for generating new control information in accordance with the supplied direction information. The transmission power control apparatus comprises a receiver for receiving a signal sent from a device to be controlled, an information arithmetic unit for generating information indicative of a characteristic of the received signal by computation on the basis of the received signal, a comparator for comparing the information obtained by the computation and a predetermined convergent value and outputting a difference obtained by the comparison, a control information converter for converting the difference into control information on transmission power for the controlled device, an information control filter for integrating the control information supplied from the control information converter over a period up to the supply of a reset signal, comparing the integrated value and predetermined threshold values set in advance in an increasing direction and a decreasing direction respectively, and outputting control information controlled in a direction corresponding to the coincident threshold value according to the coincidence of comparisons between the integrated value and the predetermined threshold values, and the reset signal, a multiplexer for incorporating the control information into a transmit signal, and a transmitter for transmitting the transmit signal to the controlled device.

4 Claims, 3 Drawing Sheets

U.S. PATENT DOCUMENTS 6,002,942 A * 12/1999 Park .......................... 455/522
6,226,526 B1 * 5/2001 Sakoda et al. ............... 455/522
6,418,137 B1 * 7/2002 Bontu et al. ................ 370/347
6,625,466 B1 * 9/2003 Dicker et al. ................ 455/522
6,940,839 B2 * 9/2005 Miyamoto .................. 370/335

* cited by examiner

FILTER DEVICE AND TRANSMISSION POWER CONTROL APPARATUS

BACKGROUND OF THE INVENTION

1. Field of the Invention

The present invention relates to a filter device, and particularly to a filter device suitable for application to transmission power control or the like used in wireless communications. The present invention also relates to a transmission power control apparatus, and particularly to a transmission power control apparatus suitable for application to a transmission power control station or the like for controlling transmission power of a device to be controlled, based on control information about power.

2. Description of the Related Art

A wireless communication system performs communications in the best communication state between a communication terminal equipment, i.e., a mobile station that performs communications while being moved, and a base station to thereby provide communication services. The base station and the mobile station monitor received power or the quality thereof each other so as to perform suitable transmission according to the distance therebetween. The wireless communication system operates so as to notify both stations of the resultant results of monitoring each other to thereby form a feedback loop related to transmitting power control. In this case, the wireless communication system is capable of suppressing power consumption as compared with the case in which communications are made at a constant power, and makes it possible to lengthen the time required to use a carrying mobile station.

In such a wireless communication system, there may be cases in which a transmission error occurs in communications between the base station and the mobile station so that transmission power cannot be always most suitably supplied. Therefore, the quality of communications cannot be maintained. Thus, a measure against such a case has been proposed in each of a transmission power control method, a base station apparatus and a communication terminal equipment described in Japanese Unexamined Patent Publication No. Hei 11(1999)-196042. This measure resides in that when a transmission power value is controlled in the direction in which the indicated contents of a received control signal exceed a power control range, in a state in which the transmission power value falls within a limit value of the power control range, the number of times that the control signal is received is counted, and when the power value is controlled in the direction not to cause the subsequent indicated contents to exceed the range, the count value of the number of times that the control signal is received, is reduced, and only when the count value has reached a predetermined value, the power is controlled in the direction not to cause the contents to exceed the power control range. Owing to this measure, the base station and the mobile station in the wireless communication system do not perform power control immediately even where they receive control of power in a wrong direction due to an error or the like, and control transmission power only when a normal control signal is received a predetermined number of times, thereby always maintaining the optimum transmission power.

The control of the transmission power by the wireless communication system will be explained in brief. Control information about transmission power communicated between the base station and the mobile station is determined based on a power control renewal cycle in which the control information is transmitted according to specs inherent in the system, and the amount of gain control by one control information, i.e., the amount of transmitting power control. As a specific example thereof, may be mentioned specs based on W-CDMA (Wide band-Code Division Multiple Access). According to the W-CDMA specs, it is provided that the power control renewal cycle is a 2560 chip, and the amount of transmitting power control takes or adopts either one of 0.5, 1,1.5 and 2 dB. The present provision is provided to suppress a vibrational phenomenon of the transmission power due to the transmitting power control.

Meanwhile, in a system wherein more precise transmission power control is performed, a power control renewal cycle is shortened on the side of a transmission power control station where transmission power is generated so that a feedback response becomes quick. However, the shorter the renewal cycle with it, the more a vibrational phenomenon of a transmit signal tends to occur noticeably. Although the tendency to allow easy occurrence of oscillations differs according to a control information extracting method in the transmission power control station, a system using the extracting method having such a strong tendency might cause vibrations in transmit signal.

As a countermeasure against it, there is known a method of changing respective set values used in the transmission power control station. However, values, which are provided in advance by the specs inherent in the system and are not able to change, also exist in the set values. As examples of the unchangeable values, may be mentioned, the amount of transmitting power control by power control information, and a power control information renewal cycle. As information signals like these, only certain specific values are restrictively set according to interface specs between transmission and reception.

In addition to it, a method of reducing loop gain in a feedback loop is known as a method of suppressing vibrations in transmit signal by power control. In the case of the transmission power control provided by the specs, however, the amount of transmitting power control and the power control information renewal cycle correspond to loop gain. There may be cases where the amount of transmitting power control and the power control information renewal cycle are set as the unalterable values as mentioned above. Accordingly, a loop gain-based adjustment might not be applied as the method of suppressing the vibrations in transmit signal.

As apparent from these reasons, the optimum control in a wireless communication system of W-CDMA or the like involves a problem that the fact that it cannot be done in accordance with communication circumstances of the system under the present situation, could happen.

SUMMARY OF THE INVENTION

The present invention provides a filter device and a transmission power control apparatus capable of outputting transmission power in the form of apparent loop gain commensurate with the present communication circumstances while maintaining settings provided as loop gain under transmission power control. The filter device comprises an integrator for integrating control information supplied thereto over a period up to being reset, and outputting an integrated value, a direction determining circuit to which a first threshold value for determining an increasing direction and a second threshold value for determining a decreasing direction are set in advance, and which compares these set threshold values and the integrated value respectively and outputs direction information indicative of a coincident control direction of these results of comparison, and an information generator for generating new control information in accordance with the supplied direction information. The transmission power control apparatus comprises a receiver for receiving a signal sent from a device to be controlled, an information arithmetic unit for generating information indicative of a characteristic of the received signal by computation on the basis of the received signal, a comparator for comparing the information obtained by the computation and a predetermined convergent value and outputting a difference obtained by the comparison, a control information converter for converting the difference into control information on transmission power for the controlled device, an information control filter for integrating the control information supplied from the control information converter over a period up to the supply of a reset signal, comparing the integrated value and predetermined threshold values set in advance in an increasing direction and a decreasing direction respectively, and outputting control information controlled in a direction corresponding to the coincident threshold value according to the coincidence of comparisons between the integrated value and the predetermined threshold values, and the reset signal, a multiplexer for incorporating the control information into a transmit signal, and a transmitter for transmitting the transmit signal to the controlled device.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFFERED EMBODIMENTS

Figure 1:
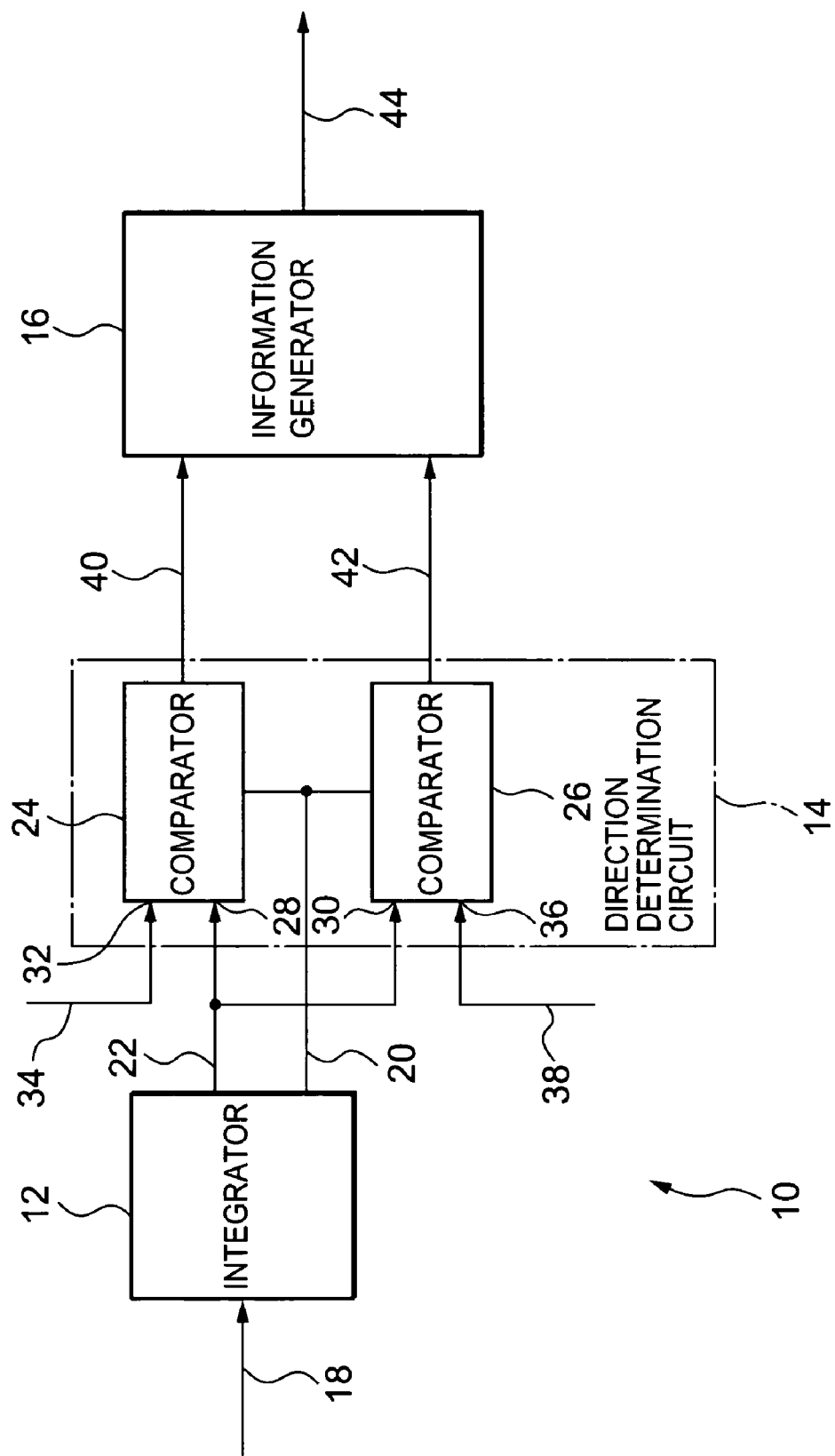
FIG. 1 is a block diagram showing a schematic configuration of an information control filter to which a filter device of the present invention is applied.

One embodiment of a filter device according to the present invention will next be described in details with reference to the accompanying drawings.

The present embodiment will explain a case in which the filter device of the present invention is applied to an information control filter 10. The illustration and description of portions directly irrelevant to the present invention will be omitted. In the following description, signals are designated at reference numerals indicative of connecting lines on which they appear.

As shown in FIG. 1, the information control filter 10 includes an integrator 12, a direction determining circuit 14 and an information generator 16. Although not shown in the figure, the integrator 12 is supplied with a clock signal that changes in level in a half cycle of a change cycle of control information. The integrator 12 has the function of inputting control information 18 related to power in response to the rising edge of the clock signal and integrating the input control information 18. The integrator 12 also has the function of integrating the supplied control information 18 until a reset signal 20 is supplied and the function of resetting an integrated value in accordance with the supply of the reset signal 20. The integrator 12 outputs the integrated value 22 to the direction determining circuit 14 in accordance with the supply of the control information 18.

The direction determining circuit 14 is provided with comparators 24 and 26 and has the function of determining whether they respectively perform control on either one of an increasing direction and a decreasing direction. In the present embodiment, the direction determining circuit 14 causes the comparator 24 to have an increase determining function and cause the comparator 26 to have a decrease determining function. In order to realize these functions, the comparators 24 and 26 are respectively supplied with the integrated value 22 on the one-end sides 28 and 30 thereof. The other end side 32 of the comparator 24 is supplied with a threshold value (first threshold value) 34 corresponding to an increase in power. Further, the other end side 36 of the comparator 26 is supplied with a threshold value (second threshold value) 38 corresponding to a decrease in power.

Now, the threshold values 34 and 38 are respectively values set in advance. For example, the individual values are respectively stored in unillustrated registers and may be supplied according to the operation of a device to which the present filter is applied.

The comparators 24 and 26 respectively compare and determine the supplied threshold value 34 and integrated value 22 and the supplied threshold value 38 and integrated value 22. Direction determination information 40 and 42 are respectively outputted to the information generator 16 as power-changing direction information from the comparators 24 and 26 each of which operates such that the integrated value 22 coincides with either one of the threshold values 34 and 38 according to either one of their coincidences. When the coincidence of the integrated value 22 with either one of the threshold values 34 and 38 is obtained as the result of comparison, either of the comparators 24 and 26 outputs the reset signal 20 to the integrator 12 in accordance with the result of comparison. In the present embodiment, the direction determination information 40 corresponds to power increase information, and the direction determination information 42 corresponds to power decrease information.

The information generator 16 has the function of outputting control information 44 related to power on the basis of the direction determination information 40 and 42 supplied in accordance with these decisions. The information generator 16 also has the function of outputting control information 44 free of an increase and a decrease in transmission power under the condition that both of the direction determination information 40 and 42 are not supplied.

The control information 44 placed under this condition will be explained in brief. When an information element that the increase and decrease in power are not made in the control information 44 is not supplied absolutely, the information generator 16 alternately and repeatedly outputs the increase and decrease in transmission power every change cycles of the power control information. Thus, a change in actually-supplied transmission power at a device to be controlled remains within the minimum range.

When configured in this way, the information generator 16 responds in accordance with the determination based on the comparison with the settings of both threshold values as compared with the case in which it directly responds in accordance with the input of the control information 18. Thus, it is possible to make the output of the control information 44 dull on a time basis and make the response loose.

Figure 2:
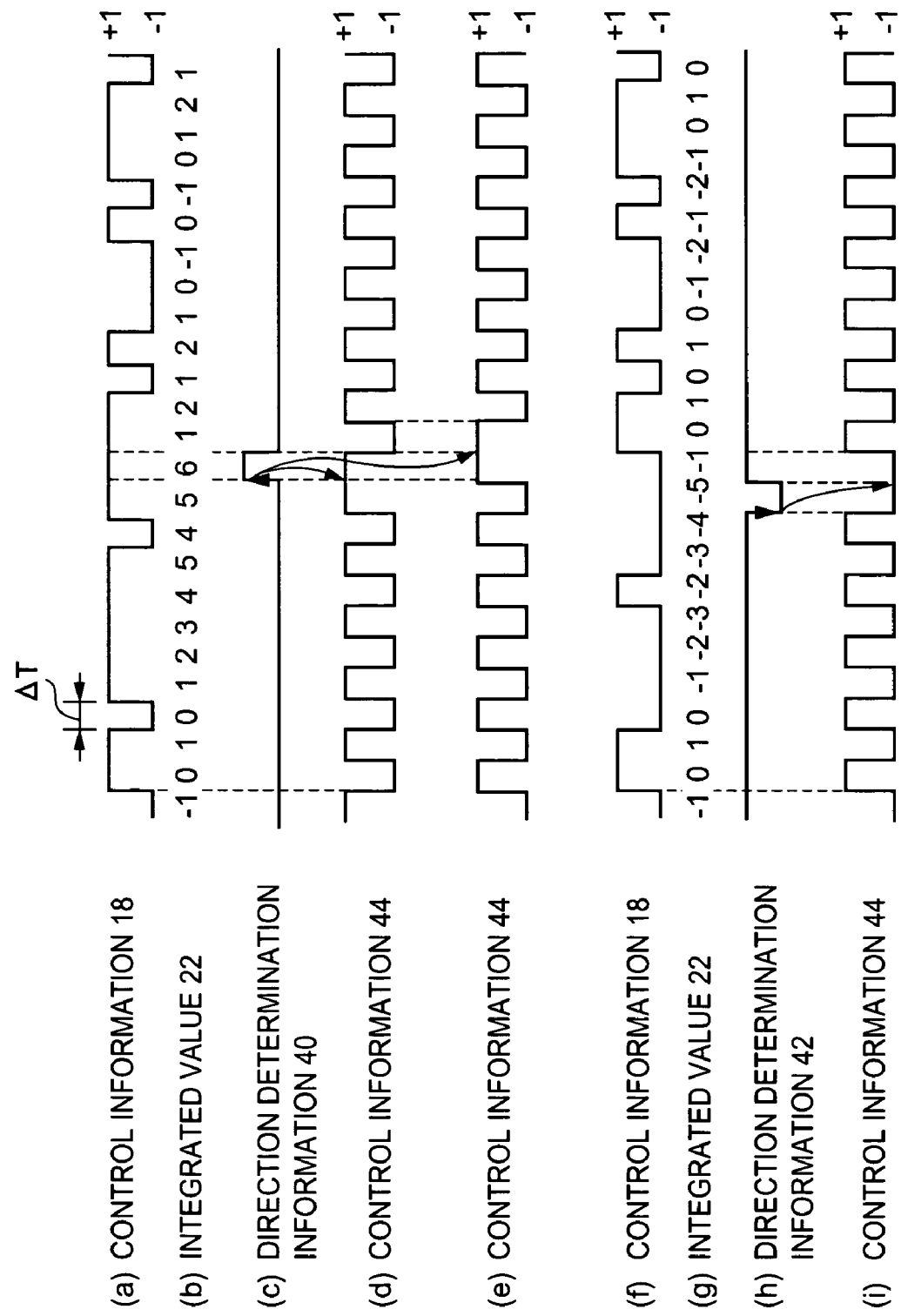
FIG. 2 is a timing chart for explaining the operation of the information control filter shown in FIG. 1.
Figure 3:
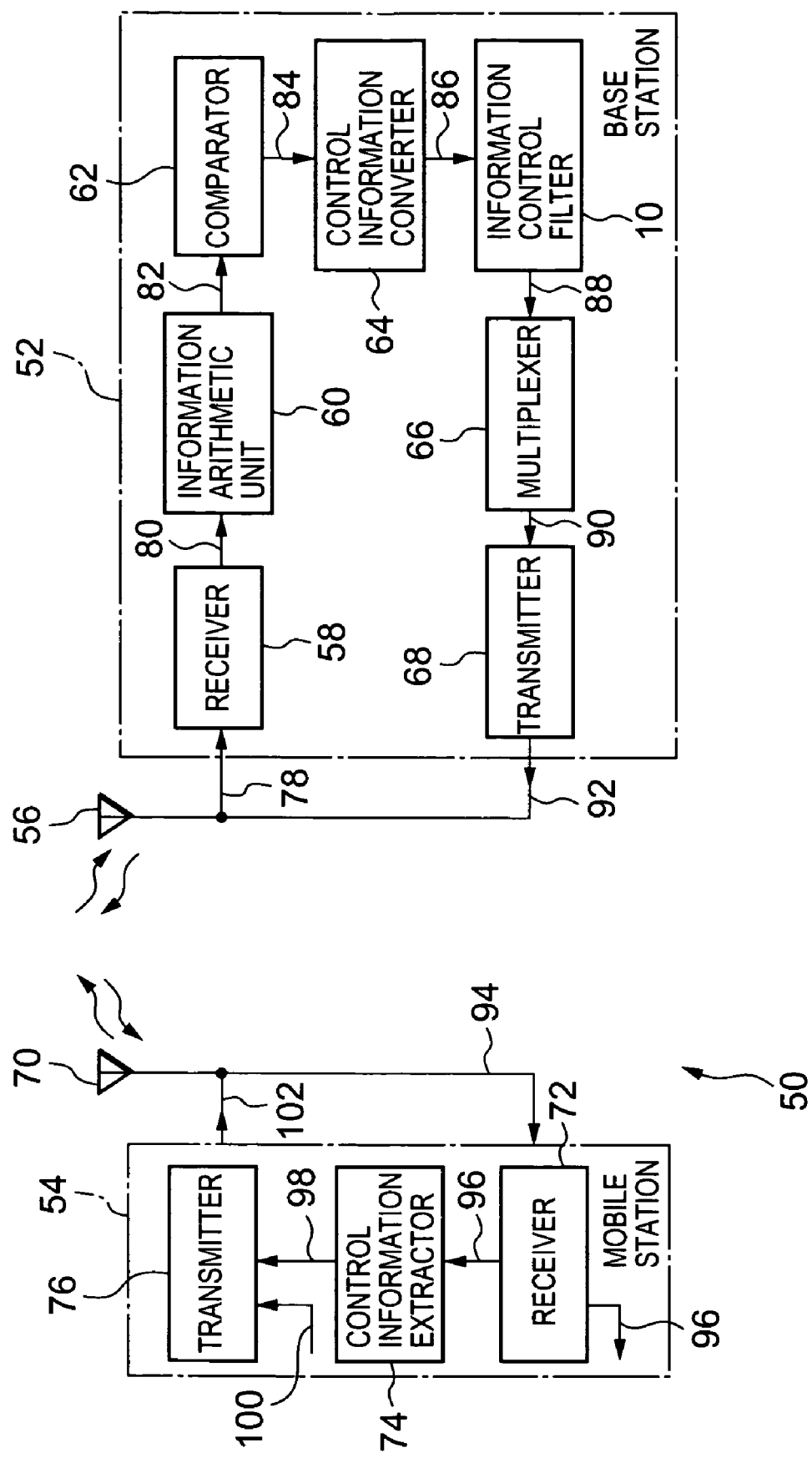
FIG. 3 is a block diagram illustrating a schematic configuration of a wireless communication system to which a transmission power control apparatus of the present invention is applied.

The operation of the information control filter 10 will next be explained with reference to FIG. 2. Respective timings where the information control filter 10 sets the threshold values 34 and 38 to +6 and −6 respectively, are shown in FIGS. 2(a) through 2(e). As the control information 18 related to the power inputted to the integrator 12, data of +1 and −1 are supplied every change cycles ΔT of the control information 18 as shown in FIG. 2(a). When +1 of these data is supplied, the integrator 12 performs addition and outputs an integrated value 22. When −1 thereof is supplied, the integrator 12 performs subtraction and outputs an integrated value 22. The information control filter 10 starts operating at the left end of FIG. 2. When "−1, 1, 1, −1, 1, 1, 1, 1, 1, −1, 1, 1, 1, 1, −1, 1, −1, −1, −1, 1, −1, 1, 1, 1, and −1" are supplied as the control information 18, the integrator 12 sequentially outputs "−1, 0, 1, 0, 1, 2, 3, 4, 5, 4, 5, 6, 1, 2, 1, 2, 1, 0, −1, 0, −1, 0, 1, 2, and 1" as shown in FIG. 2(b). The integrator 12 supplies an integrated value 12 to the comparators 24 and 26.

+6 is supplied and set to the comparator 24 as a threshold value 34. Also −6 is supplied and set to the comparator 26 as a threshold value 38. The comparators 24 and 26 respectively compare the set threshold values 34 and 38 and the supplied integrated value 22, and determine whether the integrated value 22 coincides with the set threshold values. When it is determined at this time that the integrated value 22 has coincided with the threshold value 34, the comparator 24 outputs direction determination information 40 to the information generator 16 as shown in FIG. 2(c). The comparator 24 supplies a reset signal 20 to the integrator 12 in response to the rising edge of the direction determination information 40, for example. The integrator 12 resets the integrated value to 0 in response to the reset signal 20. The integrated value 22 outputted from the integrator 12 results in either "1" or "−1" by this reset and the supplied control information 18.

The information generator 16 generates control information so as to perform control for increasing power in accordance with the supply of the direction determination information 40. When the direction determination information 40 is not yet supplied to the information generator 16, the information generator 16 alternately repeats an increase in power and a decrease in power every change cycles ΔT and generates and outputs control information such that a change in transmission power at the controlled device remains at the minimum. The outputted control information 44 shown in FIG. 2(d) is generated in consideration of such two generating conditions. That is, the information generator 16 inserts the power increase (level H) into a spot where the repeatedly generated control information originally reaches the power decrease (level L), with the rise timing of the direction determination information 40, and outputs the resultant information therefrom.

On the other hand, when the information generator 16 is outputting control information 44 whose phase is shifted by the change cycle ΔT with respect to the control information 44 shown in FIG. 2(d), the power increase in the repeatedly generated control information and the power increase in the direction determination information 40 overlap with each other with the rise timing of the direction determination information 40, so that control made as the power increase in the direction determination information 40 is not exerted. Thus, in order to effectively exert the power increase in the direction determination information 40, the information generator 26 takes account of whether the output control information 44 at the time that the immediately preceding value of the integrated value 22 is (a threshold value −1), is brought to a level L. When the direction determination information 40 is supplied after such conditions have been established, the information generator 16 generates control information about a power increase corresponding to the direction determination information 40 with being shifted by the change cycle ΔT. Thus, the control information about the increase in power are outputted twice in succession. After the generation of the control information, the information generator 16 generates control information again in such a manner that a change in transmission power remains at the minimum. The output control information 44 generated in consideration of the above in this way is illustrated in FIG. 2(e).

Next, respective timings where the threshold values 34 and 38 at the information control filter 10 are respectively set to +5 and −5, are shown in FIGS. 2(f) through 2(i). FIG. 2(f) shows input control information 18, and FIG. 2(g) shows an integrated value 22 outputted from the integrator 12. The integrator 12 supplies the integrated value 22 to the comparators 24 and 26. +5 is supplied and set to the comparator 24 as a threshold value 34. Also −5 is supplied and set to the comparator 26 as a threshold value 38. The comparators 24 and 26 respectively compare the set threshold values 34 and 38 and the supplied integrated value 22, and determine whether the integrated value 22 coincides with the set threshold values. When it is determined at this time that the integrated value 22 has coincided with the threshold value 38, the comparator 26 outputs direction determination information 42 to the information generator 16 as shown in FIG. 2(h). The comparator 26 supplies a reset signal 20 to the integrator 12 in response to the falling edge of the direction determination information 42. The integrator 12 resets the integrated value to 0 in response to the reset signal 20. The integrated value 22 outputted from the integrator 12 results in either "1" or "−1" by this reset and the supplied control information 18.

The information generator 16 generates control information so as to perform control for decreasing power in accordance with the supply of the direction determination information 42. When the direction determination information 42 is not yet supplied to the information generator 16, the information generator 16 alternately repeats an increase in power and a decrease in power every change cycles ΔT and generates and outputs control information such that a change in transmission power at the controlled device remains at the minimum. The output control information 44 is generated in consideration of such two generating conditions. That is, although not shown in the figure, the information generator 16 inserts the power decrease (level L) into a spot where the repeatedly generated control information originally reaches the power increase (level H), with the fall timing of the direction determination information 42, and outputs the resultant information therefrom.

In the information generator 16, however, the power decrease in the repeatedly generated control information and the power decrease in the direction determination information 42 overlap with each other with the fall timing of the direction determination information 42. Therefore, control made as the power decrease in the direction determination information 42 is not exerted. Thus, in order to effectively exert the power decrease in the direction determination information 42, the information generator 26 takes into consideration whether the output control information 44 at the time that the immediately preceding value of the integrated value 22 is (a threshold value −1), is taken as a level L. When the direction determination information 42 is supplied after such conditions have been established, the information generator 16 generates control information about a power decrease corresponding to the direction determination information 42 with being shifted by the change cycle ΔT. Thus, the control information about the decrease in power are outputted twice in succession. After the generation of the control information, the information generator 16 generates control information again in such a manner that a change in transmission power remains at the minimum. The output control information 44 generated in consideration of the above in this way is illustrated in FIG. 2(i).

By allowing the information control filter to operate in this way, the number of times that control information is outputted, is suppressed by determination based on its comparison with threshold values as compared with the original number of times that it is outputted, and an increase and a decrease in transmission power are controlled while a change in transmission power is being minimized. The information control filter 10 generates control information in consideration of overlapping of timings provided to perform such repetitive control as to minimize the change in transmission power and control on the increase/decrease in power, thereby making it possible to effectively reflect the result of comparison/determination.

A description will next be made of an embodiment in which a transmission power control apparatus of the present invention is applied to a base station 52 of a wireless communication system 50. The wireless communication system 50 is constructed of a base station (control station) that controls transmission power, and a mobile station (station to be controlled) 54 in which the transmission power is controlled. The base station 52 includes an antenna 56, a receiver 58, an information arithmetic unit 60, a comparator 62, a control information converter 64, an information control filter 10, a multiplexer 66 and a transmitter 68. The mobile station 52 includes an antenna 70, a receiver 72, a control information extractor (separator) 74 and a transmitter 76. The antennas 56 and 70 are respectively shared antennas corresponding to transmission/reception. The base station 52 receives therein radio waves transmitted from a plurality of mobile stations via the antenna 56 and supplies a received signal 78 to the receiver 58.

The receiver 58 amplifies the received signal 78 by a low noise amplifier. The receiver 58 performs, for example, semi-synchronous detection and outputs A/D-converted data 80 to the information arithmetic unit 60. The information arithmetic unit 60 is a component lying within an unillustrated baseband signal processor. The information arithmetic unit 60 has the function of performing inverse diffusion of the received signal, chip synchronization, decoding of an error correction, etc. in the baseband signal processor, and computing or calculating an S/N ratio of data supplied thereto as information about power. The renewal of power control is performed in a cycle of 2560 chip as provided by 3 GPP TS 25.214 V3.9.0. The information arithmetic unit 60 supplies information 82 obtained based on this provision to the comparator 62.

The comparator 62 is a component contained in an unillustrated control unit. A convergent value is set to the comparator 62 in advance. The convergent value corresponds to a convergent target value represented by a radio (S/N ratio) of a desired wave and noise. The comparator 62 outputs a difference 84 between the supplied information 82 and the convergence value to the control information converter 64.

The control information converter 64 is a component contained in the control unit and has the function of converting the difference 84 into control information 86 according to the magnitude of the supplied difference 84. As to the conversion thereof by the control information converter 64, for example, +1 is outputted when the difference 84 is greater than 0, whereas when the difference 84 is less than or equal to 0, −1 is outputted.

The information control filter 10 has the function of inputting the control information 86 supplied from the control information converter 64, making slow a response to the input of the control information 86 and outputting control information 88 therefrom. The information control filter 10 includes the components shown in FIG. 1, and operates as shown in FIG. 2 and supplies the control information 88 to the multiplexer 66 lying within a demonstratively unillustrated baseband processor. The multiplexer 66 incorporates the supplied control information 88 into a predetermined position of a transmit signal 90 and outputs it to the transmitter 68. In the baseband processor, addition of an error correction code to transmit data, framing, data modulation and diffusion modulation, data separation, etc. are carried out in addition to the operation of the multiplexer 66.

The transmitter 68 includes a D/A converter, a quadrature modulator and a power amplifier not shown in the drawing. The transmitter 68 D/A-converts the transmit data 90 supplied from the multiplexer 66, converts the D/A-converted data into a high frequency signal by quadrature modulator, amplifies the high frequency signal 92 to required power by the power amplifier and outputs it to the antenna 56. The base station 52 transmits a radio wave to the mobile station 54 through the antenna 56.

The mobile station 54 is basically similar in configuration to the base station 52 and includes at least the antenna 70, receiver 72, control information extractor 74 corresponding to a component of a baseband processor, and transmitter 76. A device for enabling compactness/portability has also been developed in addition to a power consumption reducing technology and a digital signal processing technology, and is in the process of being used in the mobile station 54. The mobile station 54 receives a radio wave via the antenna 70 and supplies a high frequency signal or a received signal 94 to the receiver 72. The receiver 72 of the mobile station 54 amplifies the supplied received signal 94 by a low noise amplifier and effects semi-synchronous detection on it, followed by A/D conversion. Data 96 obtained by bringing the received signal 94 into digital form is subjected to baseband processing and then supplied to the control information extractor 74 corresponding to one of the components of the baseband processor.

The control information extractor 74 has the function of extracting control information about power contained in the data 96. The control information extractor 74 extracts the corresponding control information from an area provided by 3 GPP TS 25.214 V3.9.0. The control information extractor 74 outputs the extracted control 98 to the transmitter 76. The transmitter 76 is supplied with transmit data 100 outputted from the unillustrated baseband processor.

The transmitter 74 effects D/A conversion on the supplied transmit data 100 and converts a transmit signal into a high frequency signal by quadrature modulation. Further, the transmitter 74 supplies control information 98 to a power amplifier to amplify and control power and transmits the high frequency signal 102 to the base station 52 as a radio wave. By allowing the base station 52 to receive the radio wave sent from the mobile station 54, a feedback loop related to power control is formed. In this case, the information control filter 10 is disposed in the base station 52 to thereby suppress the output of the control information 88 serving as loop gain, whereby the control information can be transmitted to the mobile station 54. In the mobile station 54, the control information 88 is extracted to control transmission power of the transmitter 76, so that the transmit signal 102 is transmitted. At this time, the transmission power at the transmitter 76 is controlled so as to apparently become small with the supply of the control information 88, i.e., the extracted control information 98.

Thus, even where it is not feasible to change the amount of transmitting power control and a power control information renewal period or cycle by the arrangement of the interface between transmission and reception, the wireless communication system 50 suppresses the number of times that the control information related to the power from the base station 52 is transmitted, thereby to make it possible to control the transmission power in such a way that the loop gain at the mobile station is caused to apparently change small. Consequently, the mobile station 54 is capable of suppressing a vibrational phenomenon developed in the transmit signal.

Owing to the provision of the configuration in the above-described manner, the information control filter 10 integrates the input corresponding to the control information 18 related to the power by means of the integrator 12, compares the integrated value 22 supplied to the direction determining circuit 14 and the threshold values 34 and 38 set to the comparators 24 and 26 respectively, supplies either one of the direction determination information 40 and 42 to the information generator 16 in accordance with the coincidence of the result of comparison, and generates and outputs the control information 44 in either of the directions, i.e., increase/decrease directions of the direction determination information 40 and 42 supplied to the information generator 16.

The information control filter 10 generates control information for minimizing a change in transmission power with respect to information under the circumstances that the direction determination information supplied to the information generator 16 are out of both the increase and decrease and both the direction determination information 40 and 42 are not supplied, i.e., it performs control for alternately repeating +1 and −1 every change cycles ΔT, thereby making it possible to drastically suppress and control the vibrational phenomenon that appears at the output of the transmit signal.

The direction determining circuit 14 determines whether the direction determination information belong to either of the increase and decrease. The direction determining circuit 14 outputs the direction determination information in accordance with the result of comparison and outputs a reset signal for erasing an integrated value corresponding to the result of computation to the integrator 12, thereby making it possible to avoid that the integrated value 22 reaches more than the threshold value set in advance and perform control for greatly reducing the amplitude of vibrations appearing on the transmit signal.

Owing to the placement of the information control filter 10 in the base station 52 in the wireless communication system 50, the transmission power can be controlled in such a manner that the loop gain at the mobile station 54 is caused to apparently change small, even where it is not possible to change the amount of transmitting power control and the power control information renewal cycle by the arrangement of the interface between the transmission and reception, whereby the vibrations that appear on the transmit signal of the mobile station 54 corresponding to the station to be controlled.

Owing to the application of the information control filter 10 to the base station 52, the base station 52 is capable of generating the control information for minimizing the change in transmission power with respect to the information under the circumstances that the supplied direction determination information are out of both the increase and decrease, and significantly suppressing and controlling the vibrational phenomenon appearing at the output of the transmit signal.

The information control filter 10 in the base station 52 determines whether the direction determination information belong to either of the increase and decrease. The information control filter 10 outputs the direction determination information in accordance with the result of comparison and outputs the reset signal for erasing the integrated value corresponding to the result of computation to the integrator 12, thereby making it possible to avoid that the integrated value 22 reaches more than the threshold value set in advance, and control the amplitude of the vibrations appearing on the transmit signal.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A filter device comprising:
   integrating means for integrating control information supplied thereto over a period up to being reset, and outputting an integrated value;
   direction determining means to which a first threshold value for determining an increasing direction and a second threshold value for determining a decreasing direction are set in advance, said direction determining means comparing these set threshold values and the integrated value respectively and outputting direction information indicative of a coincident control direction of these results of comparison; and
   information generating means for generating new control information in accordance with the supplied direction information in such a manner that the control information about increase or decrease in power are outputted twice in succession based on the control information value at the timing at which the first or the second threshold value minus one was met.

2. The filter device according to claim 1, wherein the information generating means generates control information for minimizing a change in transmission power under the condition that the supplied direction information is out of both an increase and a decrease.

3. The filter device according to claim 1, wherein the direction determining means determines whether the direction information belongs to either of the increase and decrease and thereby outputs the direction information according to the result of comparison and outputs a reset signal for erasing the integrated value corresponding to the result of computation to the integrating means.

4. The filter device according to claim 2, wherein the direction determining means determines whether the direction information belongs to either of the increase and decrease and thereby outputs the direction information according to the result of comparison and outputs a reset signal for erasing the integrated value corresponding to the result of computation to the integrating means.

* * * * *